Feb. 19, 1963  M. E. RODGERS, JR  3,078,002
FASTENER
Filed May 21, 1959  2 Sheets-Sheet 1
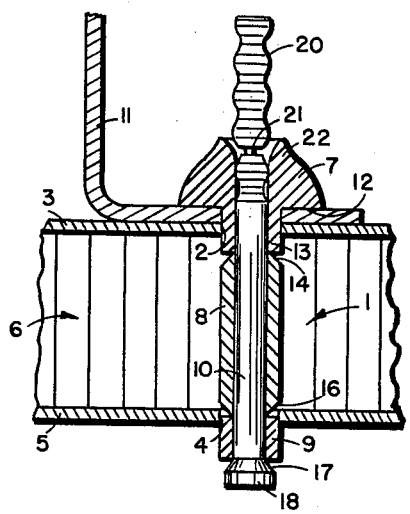
FIG. 1
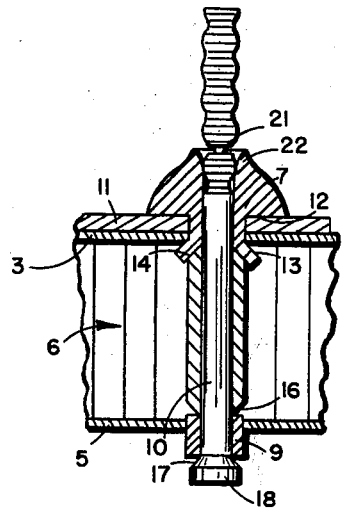
FIG. 2
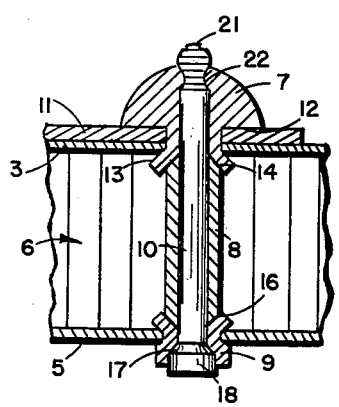
FIG. 3
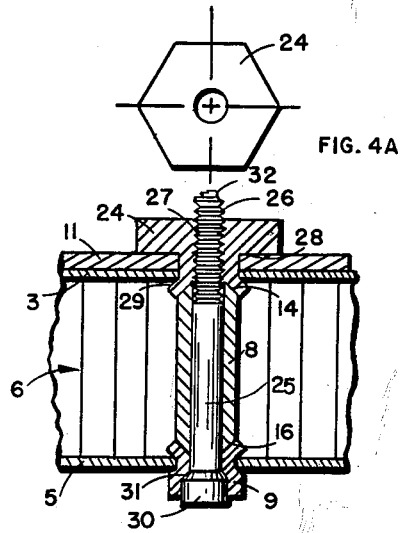
FIG. 4A
FIG. 4
INVENTOR.
MARION E. RODGERS, Jr.
BY Noel G. Conway
ATTORNEY

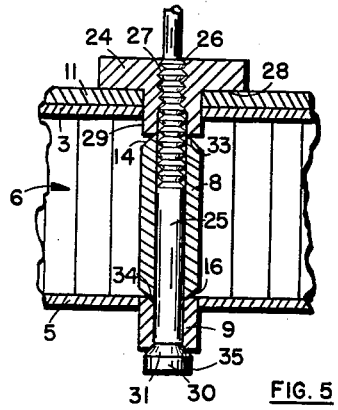

United States Patent Office 3,078,002
Patented Feb. 19, 1963

3,078,002
FASTENER
Marion E. Rodgers, Jr., Torrance, Calif., assignor to North American Aviation, Inc.
Filed May 21, 1959, Ser. No. 814,810
13 Claims. (Cl. 218—29)

This invention pertains to fasteners and more particularly to fasteners which are capable of individually gripping two spaced sheets.

More particularly, this invention relates to fasteners for use with sandwich-type structural materials and which are capable of individually gripping each of the two face sheets of the structural material.

In our modern aircraft, the strength of material as compared to its weight is very important. This requirement has led to the increased use of structural material having two faced sheets with low density material, such as honeycomb, core separating these two faces. This structure has the beneficial high strength-to-weight and rigidity-to-weight ratio desired, but has the disadvantage that both of the face sheets must be individually gripped in order to apply the maximum load to the structural material at any one point without crushing the material. The conventional rivet which does not have any spacing means on it would cause the face sheets to crush when a load is applied. Further, it has been found to be expensive and unreliable to attempt to provide a rivet spacer between these space sheets and then rivet the sheets together in a conventional manner. Another requirement of the aircraft industry is that a rivet be able to be installed without requiring access to both sides of the material in which the rivet is applied. Therefore, it is an object of this invention to provide a fastener for engaging material at spaced points.

It is a further object of this invention to provide a fastener which will individually grip two spaced sheets.

It is a further object of this invention to provide a fastener of the blind type which will individually grip two sheets which are spaced apart from each other at a predetermined distance.

It is still a further object of this invention to provide a blind rivet which will grip first one face sheet and then the other face sheets of honeycomb structure while the rivet is being installed to avoid crushing the material.

Other objects will become apparent in the following detailed description taken in connection with the accompanying drawings in which FIG. 1 shows a cross-sectional view of one modification of the fastener when ready to be installed;

FIG. 2 shows the fastener as one of the face sheets has been gripped;

FIG. 3 shows the fastener after it has been installed with both face sheets gripped;

FIGS. 4 and 4a show another embodiment of the fastener in the installed position;

FIG. 5 still shows a third embodiment of the fastener in position ready to be installed;

FIG. 6 shows a fourth embodiment of the present invention before it is installed;

FIG. 7 shows the embodiment of the invention in FIG. 6 in the installed position;

FIG. 8 shows a fifth embodiment of the invention before it is installed;

And FIG. 9 shows the embodiment of the invention shown in FIG. 8 in the installed position.

FIG. 1 discloses one embodiment of the present invention generally referred to by the numeral 1 extending through a hole 2 in upper sheet 3 and a hole 4 in lower sheet 5 of a honeycomb structure indicated generally by the arrow 6. Throughout this description, the various embodiments of the invention will be described as being used in conjunction with honeycomb structure; however, it is to be understood that the present fasteners can be used anywhere that it is desired to grip two spaced sheets. Honeycomb structure is merely representative of such structural material. In order to facilitate the description of the invention the fasteners will be described and claimed with the head element of the fastener above the rest of the fastener as shown; however, the claims are not to be limited to fasteners in such position.

The fastener head 7, shown above the upper sheet 3 of the honeycomb structure, is abutting central spacer or spacer portion 8 below it. Abutting the lower end of the central spacer portion 8 is a lower cylindrical portion, or cylindrical member 9, which is deformable as described below. A pin or mandrel 10 extends upwardly through the center of the fastener elements or portions which have inside bore portions of a diameter slightly larger than the mandrel 10 and therefore slidably encircle the mandrel. Typically the fastener is used to attach a bracket 11 to the honeycomb structure; however, it is to be realized that bracket 11 is merely representative of any member to be attached to structural material having spaced sheets by the subject invention.

The fastener head 7 has a downwardly facing shoulder 12 engaging the bracket 11. The head is also provided with a downwardly extending cylindrical portion 13 extending downwardly from the inner circumferential edge of the shoulder 12 at a distance substantially greater than the thickness of the sheet 3 of the bracket 11. The spacer portion 8 which has an outside diameter substantially equal to cylindrical portion 13 is provided with an upwardly extending cylindrical portion terminating at the upper edge or end of the spacer portion. The lower edge of the cylindrical portion 13 abuts the upper edge of the cylindrical portion on the spacer portion 8 in the position shown. In the various embodiments of the present invention shown, either the upwardly extending cylindrical portion on the spacer or the cylindrical portion on the head is deformed outwardly by the other of the two last-mentioned cylindrical portions during the installation process. In this embodiment, the lower end of the cylindrical portion 13 is deformed outwardly to engage the lower face of sheet 3 with the outside surface of the cylindrical portion 13 as cylindrical portion on spacer portion 8 is provided with a downwardly and outwardly extending circumferential camming surface 14. An upwardly and outwardly extending circumferential camming surface 16 is provided on the spacer portion 8 spaced downwardly from the camming surface 14 a distance slightly less than the distance between the sheets 3 and 5. This camming surface 16 abuts the upper end of the cylindrical portion or member 9 and is a means to deform the upper end of the cylindrical portion 9 outwardly to grip the upper face of the lower sheet 5 by the installation process described below. The enlarged portion 18 on the mandrel 10 is provided with a downwardly and outwardly extending circumferential camming surface 17 on its upper side which engages the lower edge of portion 9. Thereby when the enlarged portion 18 of the mandrel is moved upwardly toward the head 7, the various elements of the fastener will be moved also and the ends of the deformable portions will be deformed outwardly by the circumferential camming surfaces to grip the respective sheets.

The fastener shown in FIG. 1 may be made of any of a number of materials such as aluminum, stainless steel, or carbon steel; however, it should be constructed so that the cylindrical portion 13 is deformed fully to grip sheet 3 before the cylindrical portion 9 is deformed as shown in FIG. 2. If the lower cylindrical portion 9 were deformed outwardly before the spacer portion 8 had been moved upwardly enough to deform the cylindrical portion 13 fully, the cylindrical member 9 would grip the lower face 5 and would tend to crush it towards the upper face 3 as the fastener installation operation was continued. Therefore, for the specific embodiment, the cylindrical portion 13 is made of more easily deformable material than the lower cylindrical portion 9, e.g., portion 13 of annealed stainless steel and portion 9 of unannealed stainless steel, or the walls of the cylindrical portion 13 are made thinner than the walls of the cylindrical portion 9, or the camming surface 14 is machined so that it makes an angle to the axis of the mandrel which is of smaller size than the angle which the camming surface 16 makes to the axis of the mandrel. Any of these conditions will cause the cylindrical portion 13 to be fully deformed prior to the deformation of the cylindrical member 9.

FIG. 3 shows the fastener after the mandrel has been moved upwardly relative to the head to its furtherest extent; the head 7 has been swaged in the area of portion 22 of the head and the mandrel was broken off at the weakened portion 21. It is seen that as the mandrel is drawn further upwardly by the pulling tool engaging the serrations 20 that the upper and lower edge of the cylindrical portion 9 will be cammed outwardly by the circumferential camming surfaces 16 and 17 causing the outside surface at the upper and lower end of portion 9 to engage the upper and lower faces of sheet 5 respectively. For best operation, these camming surfaces should be formed with the same size of angle between the respective surfaces and the axis on the mandrel in order that both ends of the cylindrical member 9 will be deformed outwardly simultaneously as the mandrel 10 is moved upwardly.

The above described embodiment included four separate components, i.e., the mandrel 10, the fastener head 7, the spacer portion 8, and the lower deformable portion 9. However, it should be understood that in the various embodiments, except the one shown in FIG. 5, these latter components may be machined out of a single piece of bar stock and be a single piece prior to the installation process. In this case, the various portions are held together by a weakened portion of a small amount of metal which is left between the camming surfaces 14 and 16 and the edges of the cylindrical portions 13 and 9 during the machining operation. The amount of metal left is just enough to hold the various portions together but is weak enough that during installation the weakened portions are broken and the ends of the deformable portions are deformed outwardly in the same manner as when the fastener is four pieces prior to installation. Also, the spacer portion 8 and the lower cylindrical portion 9 may be held together in such a manner with the head 7 made of a separate larger piece of bar stock. Such a fastener would be installed in the same manner as the other embodiments.

FIG. 4 discloses another embodiment of the invention in its fully installed condition. The head 24 encircles the mandrel 25 as does the spacer 8 and the lower deformable cylindrical member 9 which are the same as shown in the first embodiment. The mandrel 25 is provided with the threads 26 which mate with the threads 27 on the head 24. During installation, a conventional installing tool holds the head 24 stationary and rotates the mandrel 25, drawing the enlarged portion 30 of the mandrel upwardly towards the head 24 by action of the threads. As in the other modification, the head is provided with a downwardly facing shoulder 28 and a downwardly extending cylindrical portion 29 extending from the inner circumferential edge of the shoulder 28. Similarly, the enlarged portion 30 of the mandrel 35 has the circumferential downwardly and outwardly extending camming surface 31 which is formed at substantially the equal and opposite angle to the axis of the mandrel that the camming surface 16 is formed. This embodiment, as the other embodiment, has the advantage that only one size hole is required through the spaced sheets. Also, here, as in the first embodiment, provisions must be made in order that the upper deformable cylindrical portion 29 will deform before the lower deformable cylindrical member 9. A weakened portion 32 is provided so that the upper portion of the mandrel 25 may be broken off and removed after installation.

FIG. 5 shows a slightly modified version of the species of the invention disclosed in FIG. 4. Here, the fastener head 24 also has its downwardly facing shoulder 28 engaging the bracket 11. However, the lower edge of the downwardly extending cylindrical portion 29 has been taper counterbored to form the downwardly and outwardly extending frustro conical surface 33 which abuts the circumferential camming surface 14 of the spacer portion 8. This species also differs from FIG. 4 in that the upper and lower edge of the lower deformable cylindrical portion 9 also has been taper counterbored to form frustro conical surfaces 34 and 35 which abut the circumferential camming surfaces 16 and 31, respectively, to facilitate deformation of portion 9. Such a modification is installed in the same manner as described in FIG. 4 whereby a portion of the installing tool holds the fastener head 24 stationary while another part of the installing tool rotates the mandrel 25, causing the enlarged portion 30 to be moved upwardly relative to the head by cooperation of the threads 26 and 27. As in the other modification the cylindrical portion 29 is more easily deformed and is fully deformed to engage the lower face of the sheet 3 before the upper and lower ends of the deformable cylindrical portion 9 are deformed outwardly by action of the camming surfaces 16 and 31, respectively, as the enlarged portion 30 is moved upwardly relative to the head.

FIG. 6 shows another embodiment of the present invention which differs from those disclosed above in that instead of the cylindrical portion on the head being deformed outwardly by a camming surface on the spacer, a cylindrical portion on the spacer is cammed or deformed outwardly to engage the lower face of the upper sheet by a camming surface on the head. This species of the invention also requires only one size hole through both face sheets. As shown, the mandrel 38 extends through the honeycomb structure and has threads 39 at its upper end. A head 40 encircles the mandrel and has threads 41 mating with the threads 39 on the mandrel similar to the two above described modifications. The head 40 is also provided with a downwardly facing shoulder or tapering surface 43 which is engaging a tapered counterbored portion 42 and a downwardly extending cylindrical portion 44 extending from the inner circumferential edge of the shoulder 43. Here, the cylindrical portion 44 is provided with an upwardly and outwardly extending camming surface 45. The spacer portion 47 encircles the mandrel 37 immediately below the head 40 and has an upwardly extending cylindrical portion 48 which has been weakened by counterboring and which terminates at its upper edge 49 abutting the camming surface 45. An outwardly and upwardly extending circumferential camming surface 50 is provided on the spacer portion 47 spaced downwardly from the upper edge 49 a distance slightly less than the distance between the inwardly facing faces of the upper and lower sheets 3 and 5.

Immediately below the camming surface 50 is a lower deformable cylindrical portion 52 which also encircles the mandrel 38. Here, as in the prior modifications, the lower deformable cylindrical portion 52 is constructed in order that the upper deformable portion 48 will be deformed during the installation process before portion 52 is deformed. This is done by either providing that cylindrical portion 48 is softer or has a thinner wall than portion 52. The mandrel 38 is provided with an enlarged portion 54 having a downwardly and outwardly extending camming surface 55 on its upper side abutting the lower edge of the cylindrical portion 52 as shown.

FIG. 7 discloses the fastener shown in FIG. 6 in the installed position. Since the sequence of deforming the deformable portions is the same as in the above described modifications, only the final view is shown. As in the other modifications, the installing tool, not shown, has a member which holds the head 40 stationary while the mandrel 38 is rotated and, by the cooperation of the threads 39 and 41, the enlarged portion of the mandrel is moved upwardly towards the head 40. During this movement upward, the lower cylindrical portion 52 is moved upwardly, moving the upwardly extending cylindrical portion 48 of the spacer portion 47 against the camming surface 45, and cylindrical portion 48 is deformed outwardly over the downwardly extending cylindrical portion 44 until the upper edge 49 of the spacer portion engages the lower face of the sheet 3. Then as the enlarged portion 54 continues to be moved upwardly towards the head 40, the upper end and the lower end of the deformable cylindrical portion 52 are deformed outwardly by the camming surfaces 50 and 55 respectively, positively engaging the upper and lower faces of sheet 5. After the fastener has been installed as shown, the mandrel is broken off at the weakened portion 53. At this time, any load which is applied to the bracket 11 is transferred by the fastener to both faces of the honeycomb structure.

FIG. 8 shows another modification of a fastener which will grip both face sheets of honeycomb structure. In this modification, a smaller hole is drilled in the lower sheet 5 than in the upper sheet 3. The figure shows the fastener in position ready for the final installing operation as in the other modifications. A mandrel 57 extends through both of the holes in the sheets 3 and 5 and is provided with threads 59 at its upper end. Fastener head 60 encircles the mandrel above the upper sheet 3 and has threads 61 engaging the threads 59 of the mandrel. The head 60 is provided with a downwardly facing shoulder 63 to engage bracket 11 or the face of one of the sheets of the honeycomb structure as required. Downwardly extending cylindrical portion 64 extends downwardly from the inner circumferential edge of the shoulder 63. The downwardly extending cylindrical portion 64 is counterbored and provides an inner shoulder 65 extending laterally between the threads 61 and the cylindrical portion 64.

Immediately below the head 60 is located a spacer portion 67 having substantially the same outside diameter as the cylindrical portion 64. A downwardly and outwardly extending camming surface 68 is provided on spacer portion 67 abutting the lower edge of portion 64. In this modification the camming surface provided at the upper end of the spacer portion does not extend inwardly to the inner diameter of the spacer portion but rather an upper edge 69 is provided slightly above the camming surface 68 with substantially the same lateral dimensions as the inner shoulder 65 providing a concentric fit between the spacer portion 67 and the head 60 of the fastener. Spaced downwardly of the camming surface 68 a distance slightly greater than the distance between sheets 3 and 5, upwardly and outwardly extending circumferential camming surface 70 is provided. The downwardly facing shoulder 71 is spaced above surface 70 with cylindrical portion 73 having an outside diameter equal to the diameter of the hole through sheet 5 extending between them. In this modification the distance between the shoulder 71 and the camming surface 68 should be slightly less than the distance between the face sheets 3 and 5 minus the wall thickness of the cylindrical portion 64 in order that the face sheets be gripped properly. Abutting the camming surface 70 is a lower deformable cylindrical portion 72 which also encircles the mandrel 57 and has an outside diameter equal to the outside diameter of the cylindrical portion 73. An upwardly facing shoulder 75 is provided on the enlarged portion 74 and engages the lower edge of cylindrical portion 72 to move the proper parts of the fastener upwardly during the installation process.

FIG. 9 shows the fastener in the final installed position after the mandrel has been rotated relative to the head 60, causing the enlarged portion 74 to be moved upwardly relative to the head and the excess mandrel is broken off at weakened portion 76. In this modification, it is not critical which of the deformable portions are deformed outwardly first. As shown, the upper edge of the cylindrical portion 72 has been cammed outwardly by the camming surface 70 and engages the lower face of face sheet 5 and the downwardly extending cylindrical portion 64 has been deformed outwardly by circumferential camming surface 68 and engages the lower face of the upper sheet 3. Thereby the bracket 11 is mounted to the honeycomb structure and any loads applied to the bracket will be applied to both face sheets of the honeycomb structure through the fastener.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A fastener adapted to extend through a structural material having upper and lower spaced sheets, said fastener comprising:
   a mandrel,
   A fastener head element encircling said mandrel and having a downwardly facing shoulder extending in a direction perpendicular to the axis of the mandrel a distance substantially greater than the radius of the mandrel and a head cylindrical portion adapted to extend downwardly through said upper sheet from the inner circumferential edge of said shoulder,
   a spacer portion encircling said mandrel and having a uniform inside and outside diameter substantially equal to the inside and outside diameters, respectively, of said head cylindrical portion,
   said spacer portion having a cylindrical camming portion extending upwardly and inwardly from the outer to the inner surface of said spacer adjacent said head cylindrical portion,
   said spacer portion provided with a lower camming surface spaced downwardly of said upwardly extending cylindrical portion,
   a lower cylindrical portion encircling said mandrel and constructed and arranged to adjoin said lower sheet,
   said portion having a uniform inside and outside diameter substantially equal to the inside and outside diameters respectively of said spacer,
   the upper edge of said lower cylindrical portion abutting said lower camming surface,
   said mandrel having an enlarged portion engaging the lower edge of said lower cylindrical portion.

2. In combination with a structural material having upper and lower spaced sheets each having upper and lower faces with superimposed aligned apertures therein, and
   an apertured member adjoining said upper sheet,
   a fastener securing said member to said material comprising:
   a generally cylindrical spacer member of predetermined wall thickness having an upwardly extending cylindrical portion terminating at its upper edge and a lower upwardly and outwardly extending camming surface at its lower end,
   a fastener head member located above said spacer member,
   said head member having a downwardly facing shoulder engaged with the upper surface of said apertured member,
   said head member having a cylindrical portion extending downwardly through said apertures in said upper sheet and in said member from the inner circumferential edge of said shoulder and abutting an upper edge portion of said spacer cylindrical portion downwardly of said upper sheet, the edge of one of said last two mentioned cylindrical portions being a circumferential camming surface, the other of said last two mentioned cylindrical portions being deformed outwardly and into engagement with the lower face of said upper sheet at a distance from the downwardly facing shoulder of said head member, said head cylindrical portion cooperating with said upper sheet and said spacer upper edge to prevent motion of said upper sheet toward said spacer, a lower cylindrical member having its upper edge portion abutting the lower camming surface of said spacer member and being outwardly deformed into engagement with the upper and lower faces of said lower sheet, said lower cylindrical member cooperating with said lower sheet and said lower camming surface of said spacer to prevent motion of said lower sheet toward said spacer, and a mandrel extending through said apertures and members, said mandrel having an enlarged portion abutting the lower edge portion of said lower cylindrical member downwardly of said lower sheet.

3. The invention as claimed in claim 2 wherein the wall of said upwardly extending cylindrical portion of said spacer is of less thickness than the wall of the rest of the spacer member, and said head cylindrical portion is provided with an upwardly and outwardly extending camming surface, whereby when said spacer is moved upwardly relative to said head the spacer cylindrical portion is deformed outwardly.

4. The invention as claimed in claim 2 wherein the deformed said other cylindrical portion is constructed of a material which is more easily deformed than said lower cylindrical member.

5. The invention as claimed in claim 2 wherein said head is provided with an inner circumferential shoulder extending laterally between said mandrel and said head cylindrical portion, said spacer being provided with a downwardly and outwardly extending camming surface displaced below the upper edge of said spacer, said head cylindrical portion being deformed outwardly and into engagement with the lower face of said upper sheet, said spacer upper edge having substantially the same lateral dimension as said inner shoulder, said spacer being provided with a downwardly facing shoulder located above said camming surface at the lower end of said spacer but substantially spaced from said downwardly and outwardly extending camming surface.

6. A structural material having upper and lower spaced facing apertured sheets, an apertured member adjoining said upper sheet, a fastener extending through said apertures, said fastener comprising a mandrel with an enlarged portion at one end thereof, a fastener head encircling said mandrel, said fastener head comprising a downwardly facing shoulder portion engaged with the upper surface of said apertured member and a head cylindrical portion extending downwardly from the inner circumferential edge of said shoulder, a spacer portion having a length which is substantially more than that of said head cylindrical portion and constructed and arranged to encircle said mandrel, said spacer portion having an upwardly and inwardly extending cylindrical upper camming portion adjacent said head cylindrical portion, said head cylindrical portion being outwardly deformed about the approximate mid-portion thereof by said upper camming portion and engaging the lower surface of said upper sheet, said head cylindrical portion, said upper camming portion, and said upper sheet cooperating to prevent relative motion of said upper sheet toward said spacer, said spacer portion being provided with a lower camming portion spaced downwardly of said upwardly extending cylindrical portion, a lower cylindrical portion having a length which is substantially less than the length of said spacer portion and constructed and arranged to encircle said mandrel, the upper portion of said lower cylindrical portion abutting said lower camming surface and being outwardly deformed at the approximate mid-portion thereof by said lower camming portion into engagement with the upper face of said lower sheet, said lower cylindrical portion, said lower camming surface, and said lower sheet cooperating to prevent relative motion of said lower sheet toward said spacer, the lower portion of said lower cylindrical portion abutting said enlarged portion and being outwardly deformed by said enlarged portion into engagement with the lower face of said lower sheet, said head cylindrical portion being more easily deformed than said lower cylindrical portion, said mandrel having an enlarged portion engaging the lower edge of said lower cylindrical portion whereby the lower portion of said deformable cylindrical portion is deformed into engagement with said upper sheet prior to the engagement of the upper portion of said lower cylindrical portion with said lower sheet.

7. In combination with a structural material having upper and lower spaced facing sheets with aligned apertures therein, and an element abutting a surface of one of said sheets and having an aperture therein aligned with said first mentioned apertures, a fastener securing said element to said material comprising:

a mandrel extending through said apertures, a lower cylindrical portion encircling one end of the mandrel and fixed to both surfaces of the other of said sheets, one end of said mandrel including means for preventing motion thereof toward said one sheet, a fastener head encircling the other end of said mandrel and having a shoulder portion in abutment with a surface of said element remote from said one sheet, said head having a portion extending through the apertures in said element and in said one sheet, a spacer encircling said mandrel between said sheets, said lower cylindrical portion cooperating with said spacer and said other sheet to prevent motion of said other sheet toward said spacer, the other end of said spacer cooperating with an end of said head portion and said one sheet to prevent motion of said one sheet toward said other sheet, one of said cooperating ends of said spacer and head portion being outwardly deformed and compressed between and engaged with both the surface of said one sheet which is remote from said element and the end of the other of said cooperating ends, and means on said other end of said mandrel cooperating with said head for preventing motion of said other end of the mandrel toward said other sheet.

8. In combination with a structural material having upper and lower spaced facing sheets with aligned apertures therein, and an element abutting a surface of one of said sheets and having an aperture therein aligned with said first mentioned apertures, a fastener securing said element to said material comprising:

a mandrel extending through said apertures, a lower cylindrical portion encircling one end of the mandrel, an enlargement on said one mandrel end, a fastener head fixed to and encircling the other end of said mandrel and having a shoulder portion in abutment with a surface of said element, said head having a portion extending through the aperture in said one sheet, a spacer encircling said mandrel between said sheets and having one end thereof in abutment with said lower cylindrical portion, one of said abutting ends of said spacer and head portion being outwardly deformed and compressed between and engaged with both the surface of said one sheet which is remote from said element and the end of the other of said cooperating ends, said one sheet, said head portion, and said one end of said spacer cooperating to prevent motion of said one sheet toward said spacer, said lower cylindrical portion having an end portion thereof cooperating with said one end of said spacer and said other sheet to prevent motion of the other of said sheets toward said one sheet, one of said last mentioned cooperating ends being outwardly deformed and compressed between and engaged with both the surface of said other sheet which faces said one sheet and the end of the other of said last mentioned cooperating ends, said lower cylindrical portion having a lower portion outwardly deformed and compressed between and engaged with both the lower surface of said lower sheet and said mandrel enlargement.

9. A fastener comprising:

a mandrel, a lower securing portion encircling the mandrel at one end thereof, said one mandrel end including an enlargement abutting said lower securing portion, an upper securing portion encircling the mandrel at one end thereof, a spacer encircling said mandrel between said upper and lower securing portions, said mandrel adapted to have a force applied thereto to effect motion thereof relative to said upper securing portion, one end of said spacer and an end of said upper securing portion including mutually cooperating means for effecting substantial deformation of one of said cooperating ends upon relative motion of said spacer and upper securing portion, the other end of said spacer and an end of said lower securing portion including mutually cooperating means for effecting deformation of one of said last mentioned cooperating ends substantially after said first mentioned deformation, whereby said upper securing portion will be secured by its deformation to a member to which it is to be affixed before the lower securing portion is secured to a second member to which it is to be affixed and said members will not be substantially drawn together by said fastener.

10. A fastener comprising:

a mandrel, a lower securing portion encircling the mandrel at one end thereof, an upper securing portion encircling the mandrel at the other end thereof, a spacer encircling the mandrel between said upper and lower securing portions, said mandrel being adapted for motion relative to said upper securing portion, means including the lower securing portion and the spacer for effecting relative motion of the spacer and upper securing portion in response to said mandrel motion, said mandrel including means for effecting motion of said lower securing portion toward said upper securing portion in response to said mandrel motion, one end of said spacer and an end of said upper securing portion including mutually cooperating means for effecting deformation of one of said cooperating ends upon said relative motion of said spacer and upper securing portion, the other end of said spacer and an end of said lower securing portion including mutually cooperating means for effecting deformation of one of said last mentioned cooperating ends upon said motion of said lower securing portion substantially after said first mentioned deformation.

11. The invention as claimed in claim 10 wherein said upper securing portion is of a wall thickness less than that of said lower securing portion.

12. The invention as claimed in claim 10 wherein said upper securing portion is constructed of a material which is more easily deformed than the material of said lower securing portion.

13. A fastener comprising:

a mandrel, a lower securing portion encircling the mandrel at one end thereof, an upper securing portion encircling the mandrel at the other end thereof, a spacer encircling the mandrel between said upper and lower securing portions, said mandrel being adapted for motion relative to said upper securing portion, said upper securing portion provided with an upper circumferential shoulder extending laterally between said mandrel and said upper securing portion outer periphery, said spacer provided with a downwardly and outwardly extending camming surface displaced below the upper edge of said spacer, said spacer upper edge having substantially the same lateral dimension as said upper circumferential shoulder, said spacer provided with a downwardly facing shoulder located above said last mentioned camming surface, means for effecting relative motion of the spacer and upper securing portion whereby when said relative motion occurs, said upper securing portion deforms outwardly, said mandrel including means for effecting motion of said lower securing portion toward said upper securing portion in response to said mandrel motion, the lower end of said spacer and the upper end of said lower securing portion including mutually cooperating means for effecting deformation of one of said last mentioned cooperating ends upon said motion of said lower securing portion.

References Cited in the file of this patent

UNITED STATES PATENTS

| | | |
|---|---|---|
| 2,652,741 | Ketchum | Sept. 22, 1953 |
| 2,691,915 | Cherry | Oct. 19, 1954 |
| 2,767,877 | Newsom | Oct. 23, 1956 |
| 2,961,760 | Horton | Nov. 29, 1960 |

FOREIGN PATENTS

| | | |
|---|---|---|
| 411,068 | France | June 7, 1910 |
| 343,992 | Great Britain | Mar. 2, 1931 |
| 91,090 | Sweden | Dec. 21, 1937 |